United States Patent
Chen et al.

(10) Patent No.: US 12,483,700 B2
(45) Date of Patent: Nov. 25, 2025

(54) CROSS-COMPONENT RESIDUAL PREDICTION BY USING RESIDUAL TEMPLATE

(71) Applicant: Tencent America LLC, Palo Alto, CA (US)

(72) Inventors: Lien-Fei Chen, Palo Alto, CA (US); Xin Zhao, Palo Alto, CA (US); Roman Chernyak, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/643,953

(22) Filed: Apr. 23, 2024

(65) Prior Publication Data

US 2024/0357097 A1 Oct. 24, 2024

Related U.S. Application Data

(60) Provisional application No. 63/461,581, filed on Apr. 24, 2023.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/159* (2014.11); *H04N 19/176* (2014.11); *H04N 19/70* (2014.11)

(58) Field of Classification Search
CPC ... H04N 19/117; H04N 19/105; H04N 19/159
See application file for complete search history.

(56) References Cited

U.S. PATENT DOCUMENTS

| | | | | |
|---|---|---|---|---|
| 8,861,594 B2 * | 10/2014 | Kim | ...................... | H04N 19/107 |
| | | | | 375/E7.243 |
| 10,200,700 B2 * | 2/2019 | Zhang | ..................... | H04N 19/14 |

(Continued)

OTHER PUBLICATIONS

K. Naser et al., "IntraTMP for Chroma Components", Document: JVET-AA0044-12, Joint Video Experts Team (JVET) of ITU-T SG 16 WP 3 and ISO/IEC JTC 1/SC 29, 27th Meeting, by teleconference, Jul. 13-22, 2022, 2 pgs.

(Continued)

*Primary Examiner* — Irfan Habib
(74) *Attorney, Agent, or Firm* — ARENTFOX SCHIFF LLP

(57) ABSTRACT

The various implementations described herein include methods and systems for coding video. In one aspect, a video bitstream includes a current image frame having a current coding block and signals a first syntax element for a residual template cross-component residual model (RT-CCRM) mode. When the RT-CCRM mode is enabled, the computing system identifies, in the current coding block, a first chroma sample and one or more luma samples corresponding to the first chroma sample, determines one or more residuals of the one or more luma samples in the current coding block, and applies a residual filter corresponding to the RT-CCRM mode to generate a first residual of the first chroma sample based on the residuals of the one or more luma samples. The computing system reconstructs the current image frame by compensating a predicted chroma sample with at least the first residual to reconstruct the first chroma sample.

20 Claims, 8 Drawing Sheets

(51) Int. Cl.
*H04N 19/159* (2014.01)
*H04N 19/176* (2014.01)
*H04N 19/70* (2014.01)

(56) References Cited

U.S. PATENT DOCUMENTS

| | | | | |
|---|---|---|---|---|
| 11,284,084 | B1* | 3/2022 | Zhang | H04N 19/17 |
| 11,463,713 | B2* | 10/2022 | Deng | H04N 19/157 |
| 11,528,506 | B2* | 12/2022 | Ma | H04N 19/176 |
| 11,877,006 | B2* | 1/2024 | Ma | H04N 19/132 |
| 12,034,942 | B2* | 7/2024 | Deng | H04N 19/157 |
| 12,206,858 | B2* | 1/2025 | Li | H04N 19/59 |
| 12,219,134 | B2* | 2/2025 | Lim | H04N 19/167 |
| 12,262,053 | B2* | 3/2025 | Ma | H04N 19/59 |
| 2013/0051469 | A1* | 2/2013 | Park | H04N 19/11 375/E7.243 |
| 2015/0016512 | A1* | 1/2015 | Pu | H04N 19/147 375/240.03 |
| 2015/0117519 | A1* | 4/2015 | Kim | H04N 19/105 375/240.02 |
| 2015/0373343 | A1* | 12/2015 | Hendry | H04N 19/70 375/240.12 |
| 2019/0349607 | A1* | 11/2019 | Kadu | H04N 19/177 |
| 2020/0154115 | A1* | 5/2020 | Ramasubramonian | H04N 19/176 |
| 2020/0252619 | A1* | 8/2020 | Zhang | H04N 19/593 |
| 2020/0267392 | A1* | 8/2020 | Lu | H04N 19/503 |
| 2020/0288126 | A1* | 9/2020 | Hu | H04N 19/96 |
| 2020/0366933 | A1* | 11/2020 | Zhang | H04N 19/593 |
| 2020/0382771 | A1* | 12/2020 | Liu | H04N 19/139 |
| 2020/0396453 | A1* | 12/2020 | Zhang | H04N 19/186 |
| 2021/0092395 | A1* | 3/2021 | Zhang | H04N 19/132 |
| 2021/0092396 | A1* | 3/2021 | Zhang | H04N 19/186 |
| 2021/0136409 | A1* | 5/2021 | Ma | H04N 19/132 |
| 2021/0297679 | A1* | 9/2021 | Zhang | H04N 19/186 |
| 2021/0314579 | A1* | 10/2021 | Hu | H04N 19/103 |
| 2021/0329273 | A1* | 10/2021 | Rusanovskyy | H04N 19/85 |
| 2021/0385469 | A1* | 12/2021 | Deng | H04N 19/186 |
| 2021/0400257 | A1* | 12/2021 | Zhao | H04N 19/136 |
| 2022/0030257 | A1* | 1/2022 | Deng | H04N 19/593 |
| 2022/0046232 | A1* | 2/2022 | Piao | H04N 19/176 |
| 2022/0060748 | A1* | 2/2022 | Budagavi | H04N 19/11 |
| 2022/0109885 | A1* | 4/2022 | Deng | H04N 19/593 |
| 2022/0116614 | A1* | 4/2022 | Zhao | H04N 19/132 |
| 2022/0124340 | A1* | 4/2022 | Deng | H04N 19/176 |
| 2023/0217026 | A1* | 7/2023 | Li | H04N 19/176 375/240.02 |
| 2024/0314294 | A1* | 9/2024 | Piao | H04N 19/159 |
| 2024/0357097 | A1* | 10/2024 | Chen | H04N 19/176 |
| 2025/0008108 | A1* | 1/2025 | Li | H04N 19/186 |
| 2025/0071305 | A1* | 2/2025 | Yang | H04N 19/44 |
| 2025/0133205 | A1* | 4/2025 | Lim | H04N 19/117 |
| 2025/0133232 | A1* | 4/2025 | Yu | H04N 19/105 |
| 2025/0142063 | A1* | 5/2025 | Xiu | H04N 19/159 |
| 2025/0227309 | A1* | 7/2025 | Kang | H04N 19/82 |

OTHER PUBLICATIONS

K. Naser et al., "EE2-3.1a: IntraTMP for Chroma Component", Document: JVET-AB0131, Joint Video Experts Team (JVET) of ITU-T SG 16 WP 3 and ISO/IEC JTC 1/SC 29, 28$^{th}$ Meeting: Mainz, DE, Oct. 20-28, 2022, 2 pgs.

Muhammed Coban et al., "Algorithm Description of Enhanced Compression Model 8 (ECM 8)", Document: JVET-AC2025, Joint Video Experts Team (JVET) of ITU-T SG 16 WP 3 and ISO/IEC JTC 1/SC 29, 29$^{th}$ Meeting, by teleconference, Jan. 11-20, 2023, 77 pgs.

Pekka Astola et al., "AHG12: Cross-Component Residual Model (CCRM) for Inter Prediction", Document: JVET-AD0108-v3, Joint Video Experts Team (JVET) of ITU-T SG 16 WP 3 and ISO/IEC JTC 1/SC 29, 30$^{th}$ Meeting: Antalya, TR, Apr. 21-28, 2023, 4 pgs.

* cited by examiner

CROSS-COMPONENT RESIDUAL PREDICTION BY USING RESIDUAL TEMPLATE

RELATED APPLICATIONS

This application claims priority to U.S. Provisional Patent Application No. 63/461,581, entitled "Cross-Component Residual Prediction by Using Residual Template," filed Apr. 24, 2023, which is hereby incorporated by reference in its entirety.

TECHNICAL FIELD

The disclosed embodiments relate generally to video coding, including but not limited to systems and methods for processing video data using cross-component residuals.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes video compression methods using a residual template cross-component residual model (RT-CCRM) to generate residuals of chroma samples from residuals of associated luma samples for reconstructing an image frame of a video bitstream. Cross-component filtering is applied in a residual domain to predict residuals of chroma samples using residuals of associated luma samples, which provides local illumination compensation and enhances coding efficiency of video content. Specifically, in some embodiments, a current coding block of a current image frame has a current template including a current luma template and a current chroma template. The current coding block corresponds to one or more reference coding blocks 436, e.g., which is located on the current image frame or a distinct reference image frame. Each reference coding block 436 has a respective reference template including a reference luma template and a reference chroma template. The reference luma template, the reference chroma template, the current luma template, and the current chroma template are applied to determine residual data of luma and chroma samples. The residual data of the luma and chroma samples of these templates are further applied to determine filter coefficients of a residual filter applied in the RT-CCRM. The residual filter having the filter coefficients is used to determine residual data of the chroma samples of the current coding block based on residual data of the luma samples of the current coding block. The current coding block is reconstructed based on the determined residual data of the chroma samples.

In accordance with some embodiments, a method of video decoding is provided. The method includes receiving a video bitstream including a current image frame and a first syntax element for a residual template cross-component residual model (RT-CCRM) mode. The method further includes, based on the first syntax element, determining that the RT-CCRM mode is enabled to generate a first residual of a first chroma sample of a current coding block of the current image frame based on one or more residuals of one or more luma samples in the current coding block. The method further includes, when the RT-CCRM mode is enabled, identifying, in the current coding block, the first chroma sample and the one or more luma samples corresponding to the first chroma sample, determining the one or more residuals of the one or more luma samples in the current coding block, and applying a residual filter corresponding to the RT-CCRM mode to generate the first residual of the first chroma sample based on the one or more residuals of the one or more luma samples. The method further includes reconstructing the current image frame at least by compensating a predicted chroma sample with the first residual to reconstruct the first chroma sample.

In accordance with some embodiments, a method of video encoding is provided. The method includes receiving video data comprising a current image frame, encoding the current image frame including a current coding block, and determining whether a residual template cross-component residual model (RT-CCRM) is enabled to generate a first residual of a first chroma sample of the current coding block of the current image frame based on one or more residuals of one or more luma samples in the current coding block. The method further includes transmitting the encoded current image frame via a video bitstream and signaling, via the video bitstream, a first syntax element to indicate whether the RT-CCRM mode is enabled to generate the first residual of the first chroma sample of the current coding block of the current image frame based on the one or more residuals of the one or more luma samples in the current coding block.

In accordance with some embodiments, a method of bitstream conversion is provided. The method includes obtaining a source video sequence including a current coding block of a current image frame and performing a conversion between the source video sequence and a video bitstream. The video bitstream includes the current image frame and a first syntax element for a residual template cross-component residual model (RT-CCRM) mode indicating whether to generate a first residual of a first chroma sample of a current coding block of the current image frame based on one or more residuals of one or more luma samples in the current coding block. A residual filter corresponding to the RT-CCRM mode is applied to generate the first residual of the first chroma sample based on the one or more residuals of the one or more luma samples, in accordance with a determination that the first syntax element indicates that the RT-CCRM mode is enabled.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes video compression methods using a residual template cross-component residual model (RT-CCRM) to generate residuals of chroma samples from residuals of associated luma samples for reconstructing an image frame of a video bitstream. In some embodiments, a current coding block of a current image frame has a current template including a current luma template and a current chroma template. The current coding block corresponds to one or more reference coding blocks 436, e.g., which is located on the current image frame or a distinct reference image frame. Each reference coding block 436 has a respective reference template including a reference luma template and a reference chroma template. The reference luma template, the reference chroma template, the current luma template, and the current chroma template are used to determine residual data of luma and chroma samples. The residual data of the luma and chroma samples of these templates are further applied to derive filter coefficients of a residual filter applied in the RT-CCRM. In accordance with the RT-CCRM, the residual filter having the filter coefficients is used to determine residual data of the chroma samples of the current coding block based on residual data of the luma samples of the current coding block. The current coding block is reconstructed based on the determined residual data of the chroma samples. As such, cross-component filtering may be applied in a residual domain to predict residuals of chroma samples using residuals of associated luma samples, thereby facilitating local illumination compensation and enhancing coding efficiency of video content.

Figure 1:
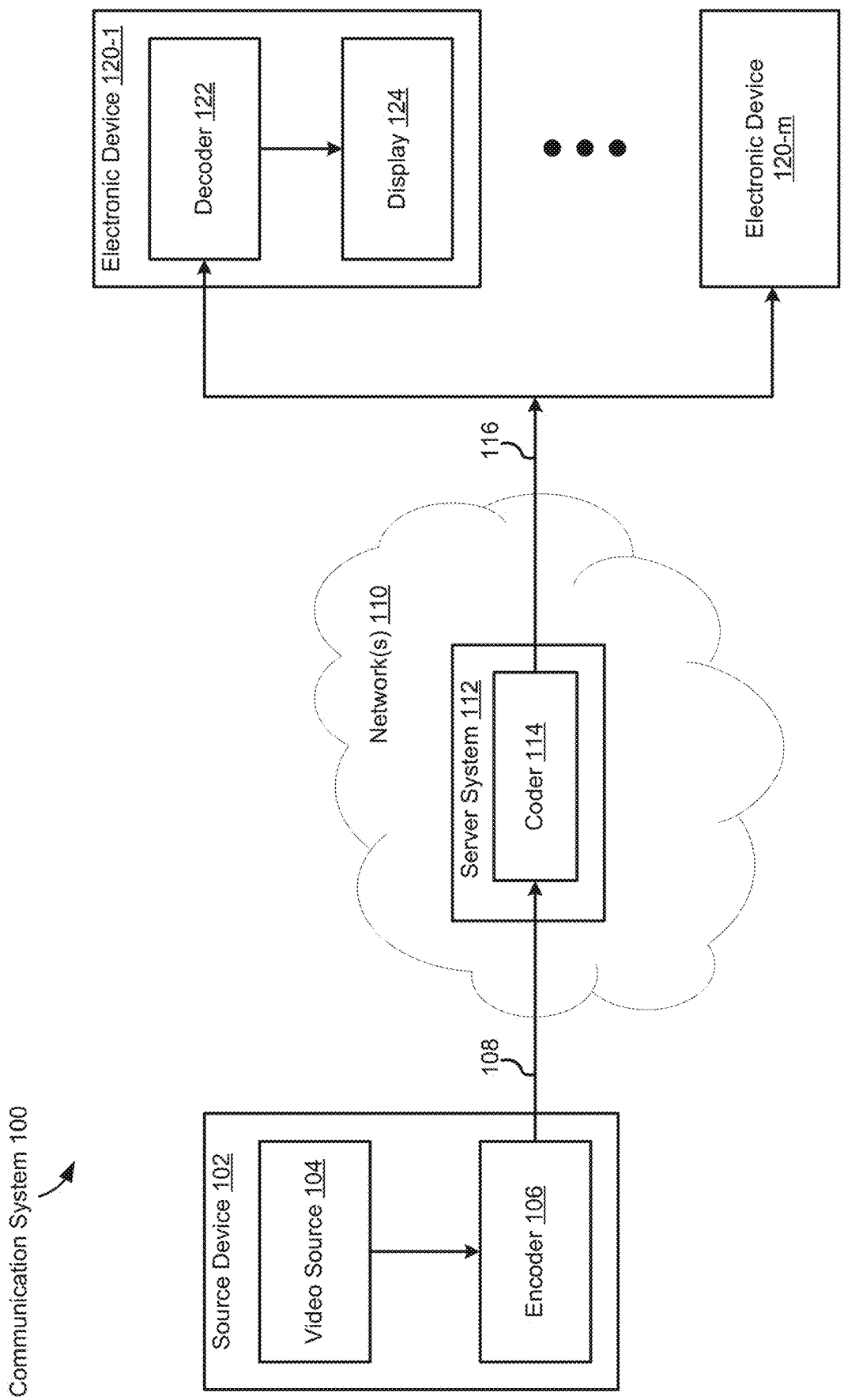
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
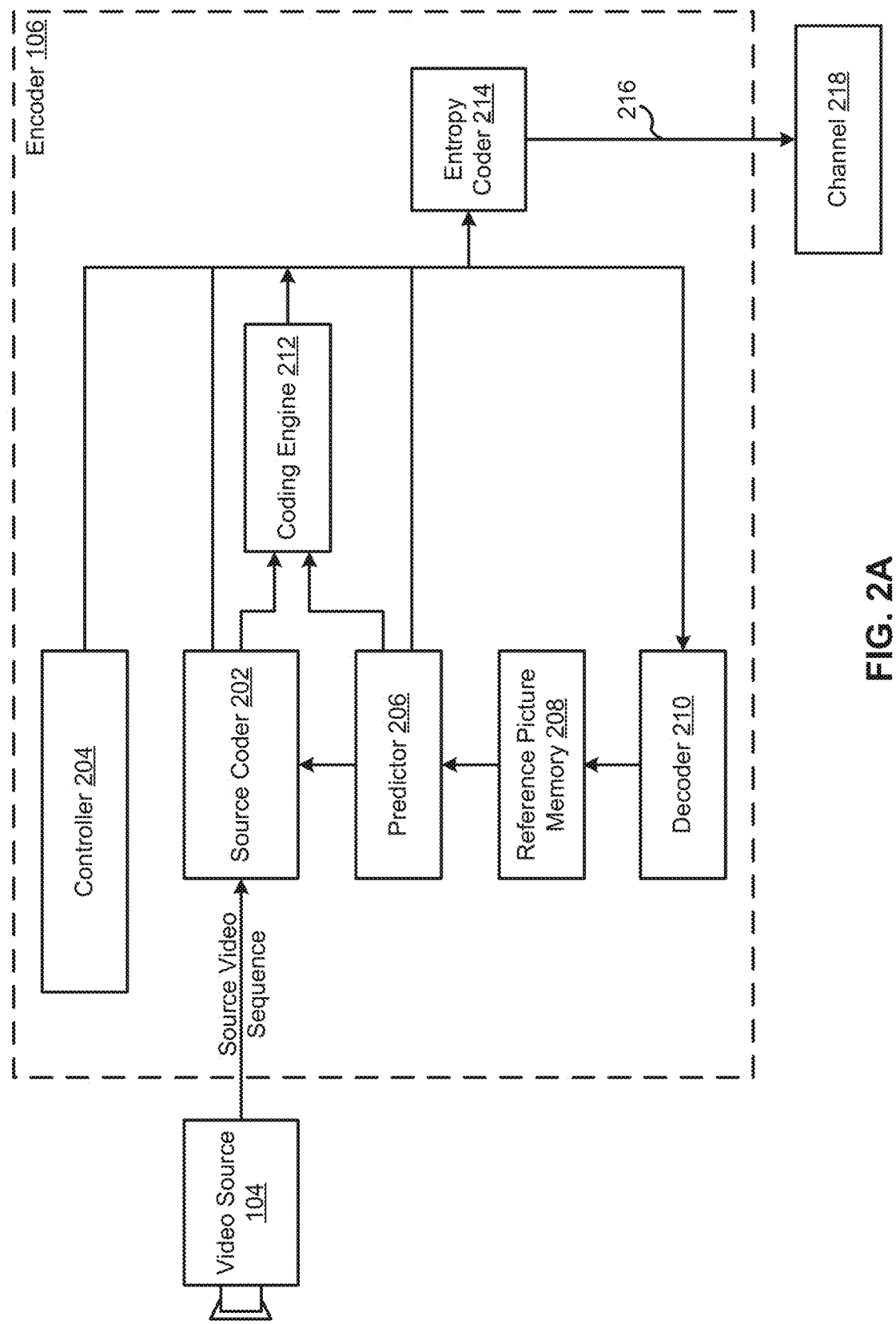
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
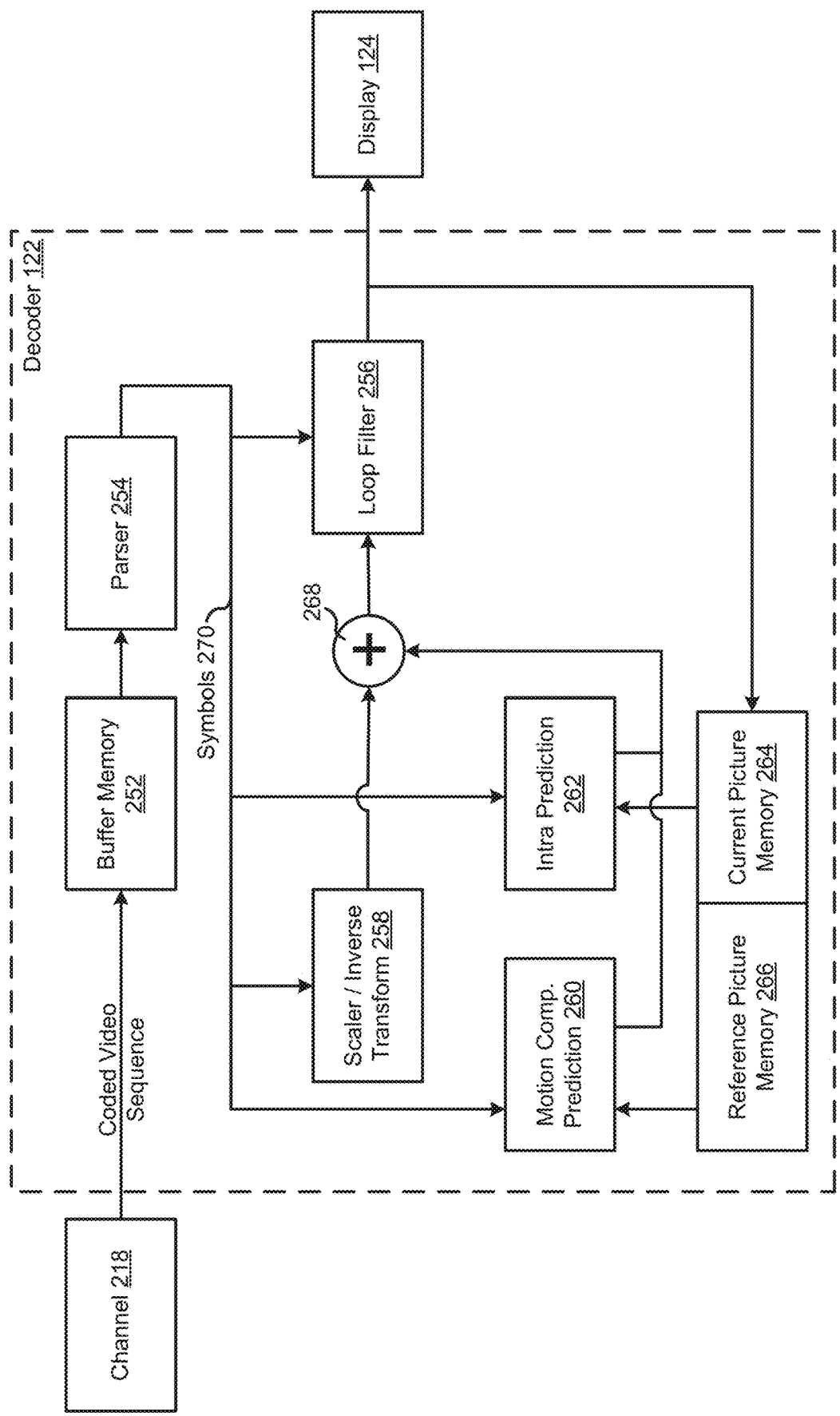
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
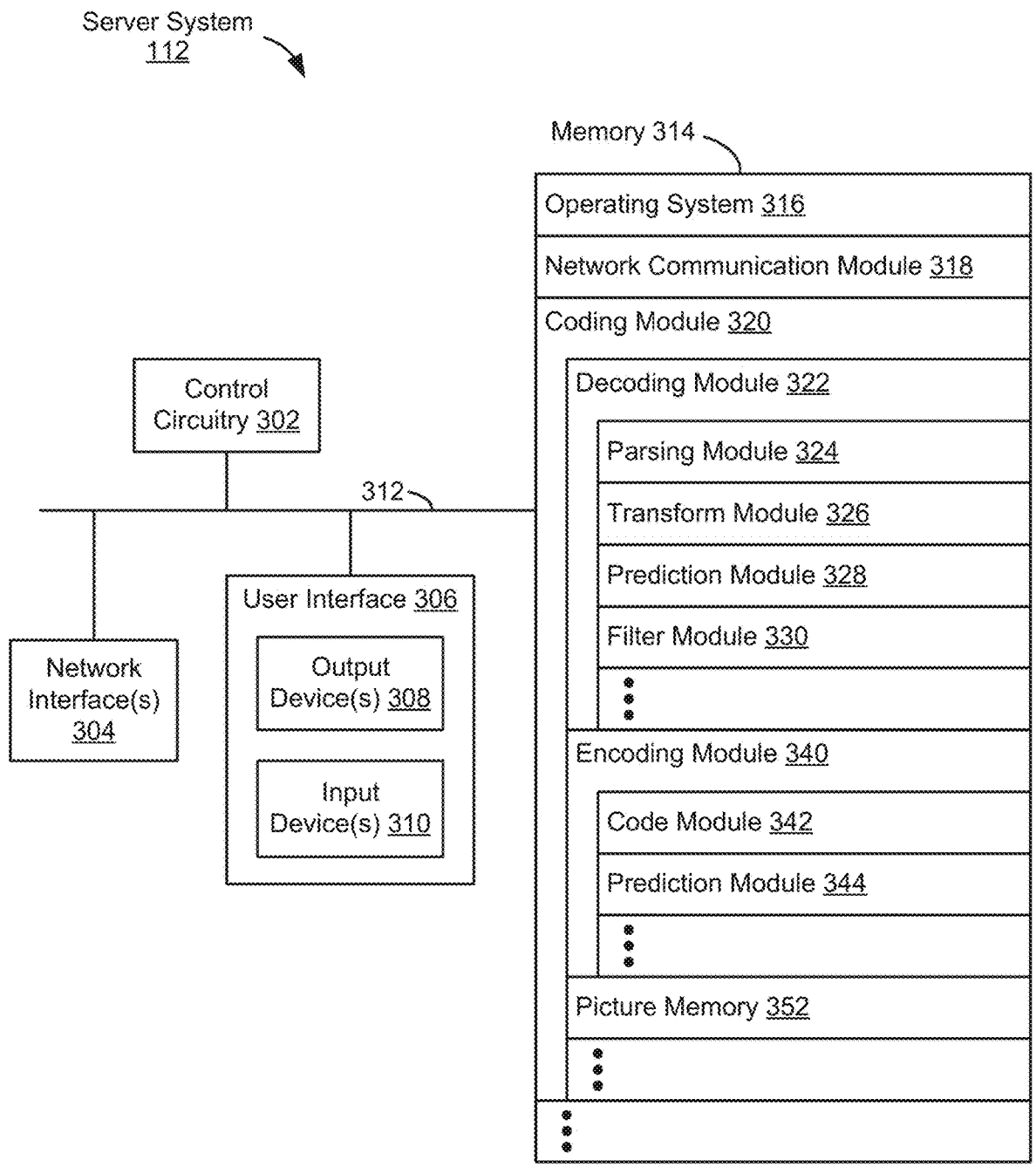
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4A:
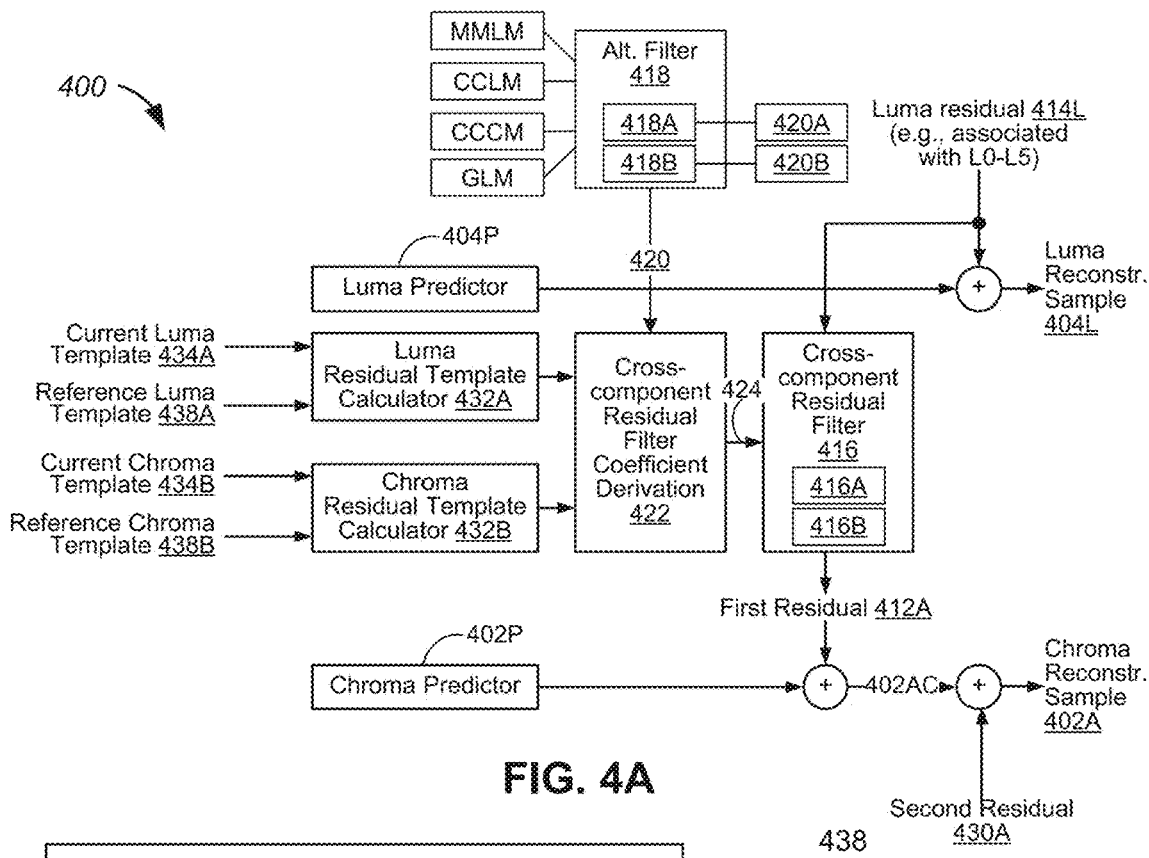
FIG. 4A is a schematic diagram of an example residual template cross-component residual model (RT-CCRM) applied in an RT-CCRM mode, in accordance with some embodiments.
Figure 4B:
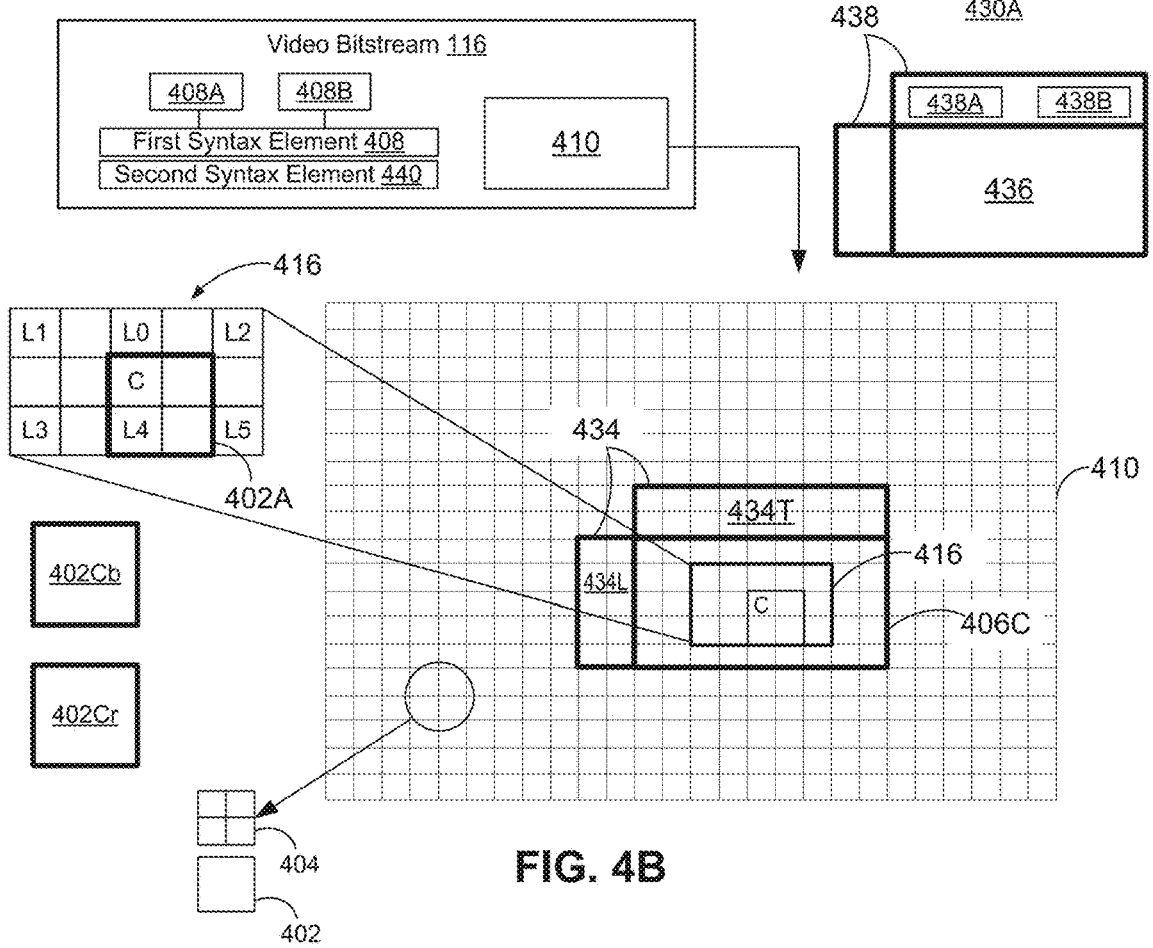
FIG. 4B is an example current image frame that is processed in the RT-CCRM mode, in accordance with some embodiments.

FIG. 4A is a schematic diagram of an example RT-CCRM 400 applied in an RT-CCRM mode, in accordance with some embodiments. FIG. 4B is an example current image frame 410 that is processed in the RT-CCRM mode, in accordance with some embodiments. A GOP includes a sequence of image frames that further includes the current image frame 410. The current image frame 410 may include a color image, i.e., a non-monochrome image frame, which has a plurality of color samples (e.g., chroma samples 402 and luma samples 404) co-located with one another. In some embodiments, a current coding block 406C of the current image frame 410 is coded according to the RT-CCRM 400 in the RT-CCRM mode. A video decoder 122 (FIG. 2B) receives a video bitstream 116 including the current image frame 410 and a first syntax element 408 for the RT-CCRM mode. Based on the first syntax element 408, the video decoder 122 determines that the RT-CCRM mode is enabled to generate a first residual 412A of a first chroma sample 402A of the current coding block 406C of the current image frame 410 based on one or more residuals 414L of one or more luma samples 404L (e.g., L0-L6 in FIG. 4B) corresponding to the first chroma sample 402A in the current coding block 406C.

When the RT-CCRM mode is enabled, the video decoder 122 identifies, in the current coding block 406C, the first chroma sample 402A and the one or more luma samples 404L corresponding to the first chroma sample 402A. The video decoder 122 determines the one or more residuals 414L of the one or more luma samples 404 in the current coding block 406C, and applies a residual filter 416 corresponding to the RT-CCRM mode to generate the first residual 412A of the first chroma sample 402A based on the one or more residuals 414L of the one or more luma samples 404L (e.g., L0-L6 in FIG. 4B). In some embodiments, the first residual 412A of the first chroma sample 402A is clipped within a dynamic range defined between a first residual value and a second residual value that is greater than the first residual value. The video decoder 122 reconstructs the current image frame 410 by compensating a predicted chroma sample 402P with at least the first residual 412A to reconstruct the first chroma sample 402A.

In some embodiments, on a video encoding side, video data includes a source video sequence including a current coding block 406C of a current image frame 410, and the source video sequence is converted to the video bitstream 116 by a video encoder (FIG. 2A). The video bitstream 116 includes the current image frame 410 and a first syntax element 408 for an RT-CCRM mode indicating whether to generate a first residual 412A of a first chroma sample 402A of a current coding block 406C of the current image frame 410 based on one or more residuals 414L of one or more luma samples 404L in the current coding block 406C. During decoding, a residual filter 416 corresponding to the RT-CCRM mode is applied to generate the first residual 412A of the first chroma sample 402A based on the one or more residuals 414L of the one or more luma samples 404L, in accordance with a determination that the first syntax element 408 indicates that the RT-CCRM mode is enabled.

In some embodiments, on a video encoding side, a video encoder 106 (FIG. 2A) generates the video bitstream 116 from video data including the current image frame 410, and provides the video bitstream 116 to the video decoder 122 (FIG. 2B). After obtaining the video data, the video encoder 106 encodes the current image frame 410 including the current coding block 406C and determines whether the RT-CCRM is enabled to generate a first residual 412A of a first chroma sample 402A of the current coding block of the current image frame based on one or more residuals 414L of one or more luma samples 404L in the current coding block 406C. The encoded current image frame 410 is transmitted via the video bitstream 116, in which a first syntax element 408 is signaled to indicate whether the RT-CCRM mode is enabled to generate the residual of the first chroma sample of the current coding block 406C of the current image frame 410 based on the one or more residuals 414L of the one or more luma samples 404L in the current coding block 406C.

Further, in some embodiments, the current coding block 406C is encoded in one of an inter predication mode, an intra block copy (IBC) mode, and an intra template matching prediction (IntraTMP) mode. The first syntax element 408 is signaled when the current coding block 406C is encoded in the one of the inter prediction mode, the IBC mode, and the IntraTMP mode. When the video decoder 122 detects the first syntax element 408, the video decoder 122 determines that the current coding block 406C is encoded in one of the inter prediction mode, the IBC mode, and the IntraTMP mode. Further, in some embodiments, it is determined that a cross-component residual model (CCRM) mode is disabled to abort prediction of the first chroma sample from reconstructed luma samples corresponding to the one or more luma samples. The first syntax element 408 is signaled, when the current coding block 406C in encoded in the one of the inter prediction mode, the IBC mode, and the IntraTMP mode and when the CCRM mode is disabled. Stated another way, in some embodiments, when the video decoder 122 detects the first syntax element 408, the video decoder 122 determines that the CCRM mode is disabled.

In some embodiments, the first syntax element 408 is reset to a value indicating that the RT-CCRM mode is disabled based on template availability and a coding block position in a picture, subpicture, a tile, or a slice of the current image frame. In an example, the first syntax element 408 is reset for the current coding block 406C. In another example, the first syntax element 408 is reset for a coding block distinct from the current coding block 406C. In some situations, a reference coding block 436 is located at a top left corner of the current image frame 410 without any template. The first syntax element 408 indicates that the RT-CCRM mode is disabled for the current coding block 406C coded based on the reference coding block 436, and the current coding block 406C is disabled from the RT-CCRM mode. In some embodiments, when the current coding block 406C is located immediately adjacent to a top boundary of the current image frame 410, the first syntax element 408 indicates that the RT-CCRM mode is disabled for the current coding block 406C, and the current coding block 406C is disabled from the RT-CCRM mode.

In some embodiments, the first syntax element 408 for the RT-CCRM mode includes a first flag 408A and a second flag 408B. The first flag 408A indicates whether the RT-CCRM mode is enabled to generate a blue chroma residual of a blue-difference (Cb) chroma sample 402Cb, and the second flag 408B indicates whether the RT-CCRM mode is enabled to generate a red chroma residual of a red-difference (Cr) chroma sample 402Cr. The first chroma sample 402A including the Cb chroma sample 402Cb and the Cr chroma sample 402Cr.

In some embodiments, the video decoder 122 determines that the current coding block 406C is predicted using an alternative filter 418 corresponding to one of a multi-model linear model (MMLM) mode, a cross-component linear model (CCLM) mode, a convolutional cross-component intra prediction model (CCCM), and a gradient linear model (GLM) mode. The alternative filter 418 has a plurality of first filter coefficients 420. The video decoder 122 (e.g., a cross-component residual filter coefficient derivation module 422) determines a plurality of filtering coefficients 424 of the residual filter 416 based on the plurality of first filter coefficients 420 of the alternative filter 418.

In some embodiments, the residual filter 416 includes a first residual filter 416A for a first one of a blue-difference (Cb) chroma sample 402Cb and a red-difference (Cr) chroma sample 402Cr. The video decoder 122 determines that the current coding block 406C is predicted using a first alternative filter 418A and a second alternative filter 418B corresponding to two distinct modes of an MMLM mode, a CCLM mode, a CCCM, and a GLM mode. The video decoder 122 (e.g., module 422) determines that the first alternative filter 418A has a plurality of first filter coefficients 420A and that the second alternative filter 418B has a plurality of second filter coefficients 420B. A plurality of filtering coefficients 424 of the first residual filter 416A are determined based on the plurality of first filter coefficients 420A of the first alternative filter 418A. A plurality of filtering coefficients 424 of a second residual filter 416B are determined based on the plurality of second filter coefficients 420B of the second alternative filter 418B. The second residual filter 416B is applied to generate a residual of a second distinct one of the Cb chroma sample 402Cb and the Cr chroma sample 402Cr.

Referring to FIG. 4A, in some embodiments, the video decoder 122 includes a luma predictor (also called a predicted luma sample 404P) providing predicted luma samples 404P that are predicted based on one or more reference coding blocks 436, which are located in the current image frame 410 or other image frame(s) in the GOP including the current image frame 410. In some embodiments, the video decoder 122 includes a chroma predictor (also called a predicted chroma sample 402P) providing predicted chroma samples 402P that are predicted based on the one or more reference coding blocks 436. A predicted chroma sample 402P corresponding to the first chroma sample 402A is compensated with the first residual 412A determined based on the one or more luma residuals 414L, generating a compensated chroma sample 402AC. In some embodiments, the compensated chroma sample 402AC is further adjusted based on a second residual 430A to reconstruct the first chroma sample 402A.

In some embodiments, the current coding block 406C corresponds to a current template 434, which is included a reconstructed portion of the current image frame 410 and includes a block of reconstructed samples that are immediately adjacent to the current coding block 406C. In some embodiments, the current template 434 is selected from a top current template 434T located on top of the current coding block 406C, a left current template 434L located to the left of the current coding block 406C, and an L-shaped current template (not shown) sharing a top edge and a left edge of the current coding block 406C. Further, in some embodiments, each reference coding block 436 of the current coding block 406C also has a reference template 438 that has the same shape and the same size as the current template 434. Template matching is a decoder-side block vector derivation method to find the closest match between the current template 434 of the current coding block 406C and a reference template 438 in a different reconstructed image frame or the reconstructed portion of the current image frame 410. A template matching cost is applied to determine whether the reference template 438 is the closest match(es) of the current template 434. In an example, a sum of absolute differences (SAD) of corresponding samples of the reference template 434 and the current template 434 is used to determine the template matching cost.

In some embodiments, the current template 434 includes a filter template applied to determine a first filter (e.g., alternative filter 418 in FIG. 4A) corresponding to one of an inter prediction mode, an intraTMP mode, an MMLM mode, a CCLM mode, a CCCM mode, and a GLM mode. For example, the same top current template 434T is applied to determine both filter coefficients 420 of one or more alternative filters 418 and filter coefficients 424 of the residual filter 416.

In some embodiments, for the current template 434, the top current template 434T has at least one row of corresponding color samples (e.g., corresponding to a row number), and the left current template 434L has at least one column of corresponding color samples (e.g., corresponding to a column number). The reference template 438 has the same shape and the same size as the current template 434. For the reference template 438, the top reference template 438T has at least one row of corresponding color samples, and the left reference template 438L has at least one column of corresponding color samples. In some embodiments, the row number is equal to the column number. Conversely, in some embodiments, the row number is not equal to the column number.

In some embodiments, the reference template 438 and the current template 434 correspond to one of a plurality of predefined template types. Further, in some embodiments, the plurality of predefined template types include at least: a first type of reconstructed top neighboring region (e.g., templates 438T and 434T), a second type of reconstructed left neighboring region (e.g., templates 438L and 434L), and a third type of reconstructed L-shape neighboring region.

Additionally, in some embodiments, the current template 434 has a current luma template 434A and a current chroma template 434B, and the reference template 438 has a reference luma template 438A and a reference chroma template 438B. The video encoder 122 includes a luma residual template calculator 432A and a chroma residual template calculator 432B. The luma residual template calculator 432A determines residuals of luma samples 404 of the current luma template 434A based on the current luma template 434A and the reference luma template 438A. The chroma residual template calculator 432B determines residuals of chroma samples 402 of the current chroma template 434B based on the current chroma template 434B and the reference chroma template 438B. The residuals of luma samples 404 and the residuals of chroma samples 402 of the current template 434 are processed by the filter coefficient derivation module 422 to determine filter coefficients 424 of the residual filter 416. After the filter coefficients 424 of the residual filter 416 are determined based on the current template 434 and the reference template 438, the residual filter 416 is applied to determine the first residual 412A of the first chroma sample 402A in the current coding block 406C based on the one or more residuals 414L of the one or more luma samples 404L.

In some embodiments, in the RT-CCRM mode, the residual filter 416 corresponds to one of a blue-difference (Cb) chroma sample 402Cb and a red-difference (Cr) chroma sample 402Cr. When a plurality of filter coefficients 424 of the residual filter 416 are not derived based on a plurality of color templates (e.g., current template 434 and reference template 438), the residual of the one of the Cb chroma sample 402Cb and the Cr chroma sample 402Cr is set to 0. In an example, filter coefficients 424 of the first residual filter 416A corresponding to the Cr chroma sample 402Cr fail to be derived from the templates 434 and 438, and a residual of the Cr chroma sample 402Cr is set to 0. In another example, filter coefficients 424 of the second residual filter 416B corresponding to the Cb chroma sample 402Cb fail to be derived from the templates 434 and 438, and a residual of the Cb chroma sample 402Cb is set to 0.

Figure 5:
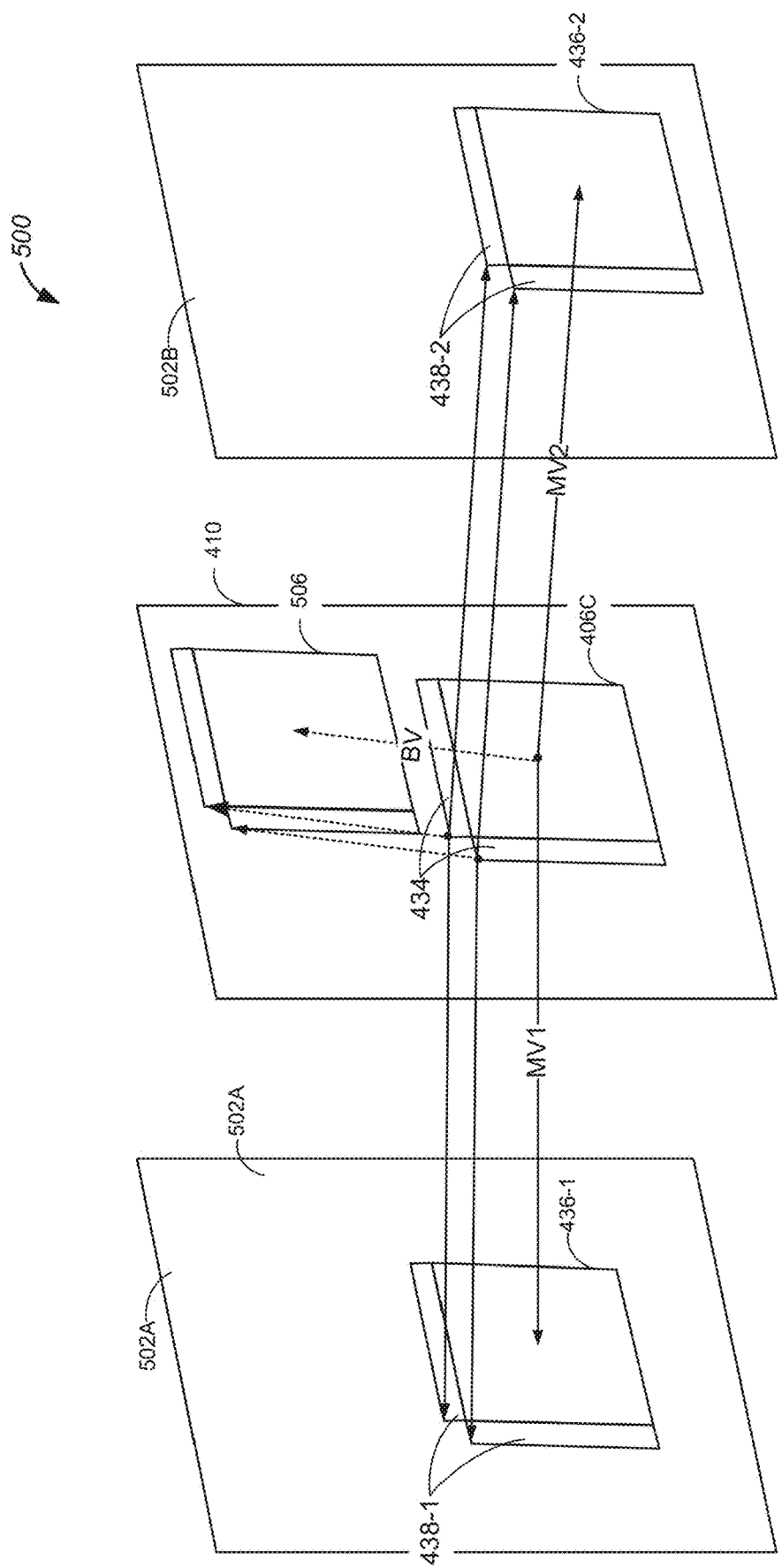
FIG. 5 is a diagram illustrating a current image frame 410 and two associated reference image frames, in accordance with some embodiments.

FIG. 5 is a diagram illustrating a GOP 500 including a current image frame 410 and two associated reference image frames 502A and 502B, in accordance with some embodiments. The current image frame 410 includes a current coding block 406C that is coded according to an RT-CCRM 400 in an RT-CCRM mode. A video decoder 122 (FIG. 2B) receives a video bitstream 116 including the current image frame 410 and a first syntax element 408 for the RT-CCRM mode. Based on the first syntax element 408, the video decoder 122 determines that the RT-CCRM mode is enabled to generate a first residual 412A of a first chroma sample 402A of the current coding block 406C of the current image frame 410 based on one or more residuals 414L of one or more luma samples 404L (e.g., L0-L6 in FIG. 4B) corresponding to the first chroma sample 402A in the current coding block 406C.

In some embodiments, the current coding block 406C corresponds to a current template 434, which is included a reconstructed portion of the current image frame 410 and includes a block of reconstructed samples that are immediately adjacent to the current coding block 406C. In some embodiments, the current template 434 is selected from a top current template 434T located on top of the current coding block 406C, a left current template 434L located to the left of the current coding block 406C, and an L-shaped current template (not shown) sharing a top edge and a left edge of the current coding block 406C. In some embodiments, the current coding block 406C is predicted based on two reference coding blocks 436-1 and 436-2 located on two reference image frames 502A and 502B in the same GOP of the current image frame 410, respectively. Each reference coding block 436-1 or 436-2 also has a respective reference template 438-1 or 438-2 that has the same shape and the same size as the current template 434. Template matching is a decoder-side block vector derivation method to find the closest two matches between the current template 434 of the current coding block 406C and the reference templates 438-1 and 438-2 in two different reconstructed image frames 502A and 502B, respectively.

In some embodiments, the video decoder 122 determines that the current coding block 406C is predicted based on a merge mode (e.g., an inter merge mode, an affine merge mode, and an intra block copy (IBC) mode). In some embodiments, the merge mode is specified whereby motion parameters (e.g., motion vectors MV1 and MV2) for the current coding block 406C are obtained from neighboring coding blocks, including spatial and temporal candidates, and additional schedules introduced in VVC. The merge mode may be applied to an inter-predicted coding block, not only for skip mode Alternatively, in some embodiments, the merge mode is implemented by explicit transmission of motion parameters (e.g., motion vector, a reference picture index for each reference picture list, and a reference picture list usage flag, other needed information) on each coding block. In accordance with the merge mode, the video decoder 122 determines a motion vector MV1 or MV2, e.g., based on motion vectors of one or more neighboring coding blocks of the current coding block 406C, and further identifies a merge candidate 436 (e.g., reference coding block 436-1 or 436-2) based on the motion vector MV1 or MV2. A reference template 438 (e.g., 438-1 or 438-2) associated with the merge candidate 436 is also identified based on the motion vector MV1 or MV2. The video decoder 122 identifies a current template 434 associated with the current coding block 406C, and determines a plurality of filter coefficients 424 of the residual filter 416 based on the reference template 438 and the current template 434. More details on determining the filter coefficients 424 of the residual filter 416 are discussed above with reference to FIGS. 4A and 4B.

In some embodiments, the merge mode corresponds to a bi-predictive prediction. The merge candidate 436 includes a first candidate 436-1 selected from a first reference list and a second candidate 436-2 selected from a second reference list. The reference template 438 is a weighted average of a first reference template 438-1 corresponding to the first candidate (e.g., reference coding block 436-1) and a second reference template 438-2 corresponding to the second candidate (e.g., reference coding block 436-2). Further, in some embodiments, the video decoder 122 determines at least one bi-prediction with CU-level weight (BCW) for the first reference template 438-1 and the second reference template 438-2, and applies the at least one BCW to determine the reference template 438 as the weighted average of the first reference template 438-1 and the second reference template 438-2. In some embodiments, the BCW is an enhanced version of bi-prediction blending of HEVC, performing a weighted averaging of the two prediction signals based on a weight selected among a pre-defined set of weights. VVC also supports geometric partitioning mode (GPM), that splits a coding block into non-rectangular sub-partitions each of which is associated with a translational motion vector.

In some embodiments, when a flag for local intensity compensation (LIC) is enabled for the merge candidate 436 (e.g., reference coding block 436-1 or 436-2), the video decoder 122 applies local intensity compensation to the reference template 438 (e.g., which is a weighted combination of the reference templates 438-1 and 438-2).

In some embodiments, an advanced motion vector prediction (AMVP) mode is enabled. The merge candidate 436 is located in a reference image frame 502A or 502B distinct from the current image frame 410. The video decoder 122 determines a motion vector of the merge candidate 436 (e.g., reference coding block 436-1 or 436-2) based on a motion vector predicator (MVP) and a motion vector difference (MVD) of the merge candidate 436. More details on a search of the MVD of the merge candidate 436 are discussed below with reference to FIG. 6.

Alternatively, in some embodiments, when an AMVP mode is enabled. the merge candidate 436 is located on the current image frame 410. The video decoder 122 determines a block vector (BV) of the merge candidate 436 based on a block vector predicator (BVP) and a block vector difference (BVD) of the merge candidate.

In some embodiments, the current coding block 406C is predicted in an IntraTMP mode. The video decoder 122 determines a merge candidate 506 based on a block vector BV, identifies a reference template 438 associated with the merge candidate 506 based on the block vector BV. The reference template 438 including a reference luma template 438A and a reference chroma template 438B. A current template 434 is associated with the current coding block 406C. Referring to FIG. 4A, a plurality of filter coefficients 424 of the residual filter based on the reference template 438 and the current template 434.

Figure 6:
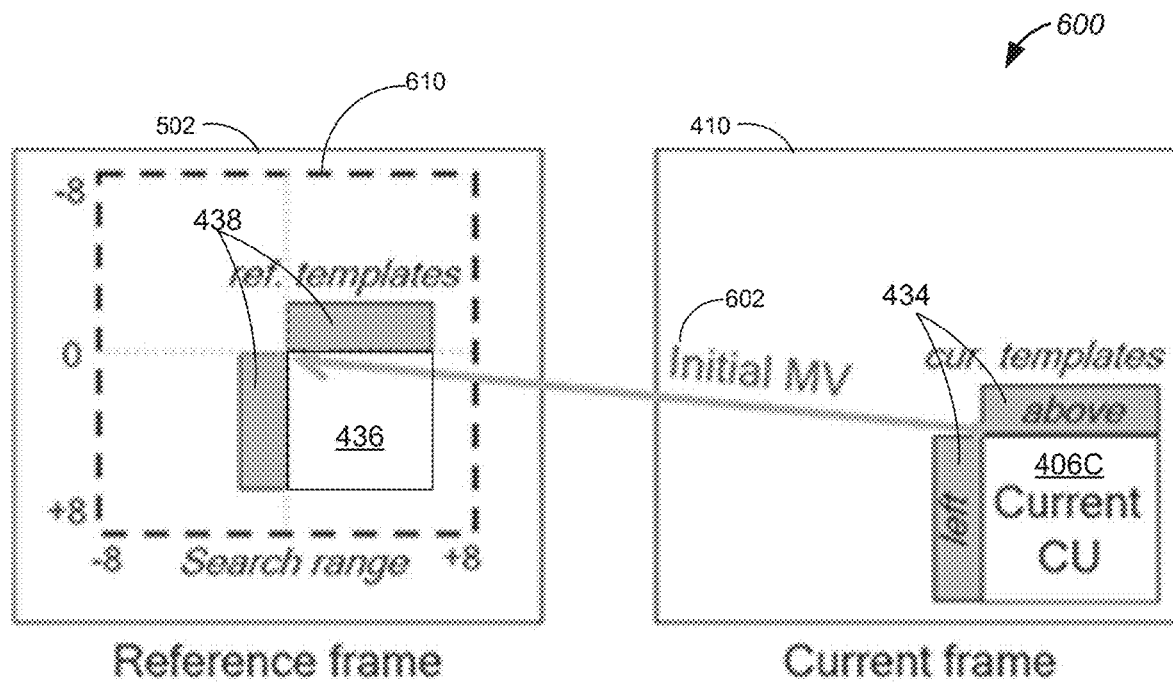
FIG. 6 is a diagram illustrating a template matching process performed on a search range around an initial motion vector, in accordance with some embodiments.

FIG. 6 is a diagram illustrating a template matching process 600 performed on a search range 610 around an initial motion vector 602, in accordance with some embodiments. In some embodiments, the video decoder 122 determines that the current coding block 406C is predicted based on a merge mode (e.g., an inter merge mode, an affine merge mode, and an intra block copy (IBC) mode). In accordance with the merge mode, the video decoder 122 determines the initial motion vector 602, e.g., based on motion vectors of one or more neighboring coding blocks of the current coding block 406C, and further identifies a merge candidate 436 (e.g., including reference coding block 436 in FIG. 4B) based on the initial motion vector MV. A reference template 438 (e.g., 438-1 or 438-2) associated with the merge candidate 436 is also identified based on the initial motion vector 602. The video decoder 122 identifies a current template 434 associated with the current coding block 406C, and determines a plurality of filter coefficients 424 of the residual filter 416 based on the reference template 438 and the current template 434. More details on determining the filter coefficients 424 of the residual filter 416 are discussed above with reference to FIGS. 4A and 4B.

Template matching is a decoder-side block vector derivation method to find the closest match between the current template 434 of the current coding block 406C and a reference template 438 in a different reconstructed image frame or the reconstructed portion of the current image frame 410. A template matching cost is applied to determine whether the reference template 438 is the closest match(es) of the current template 434. In an example, a sum of absolute differences (SAD) of corresponding samples of the reference template 434 and the current template 434 is used to determine the template matching cost. More specifically, the template matching cost is monitored, when a motion vector is searched around the initial motion vector 602 of the current coding block 406C within the search range 610, .e.g., a [−8, +8] pel search range. In some embodiments associated with JVET-J0021, template matching is implemented using a search step size determined based on an AMVP mode, and may be cascaded with bilateral matching in merge modes.

The closest match of the reference template 438 corresponds to the candidate match 436 (also called the reference coding block 436 in FIG. 4B) for the current coding block 406C, and the plurality of filter coefficients 424 of the residual filter 416 are determined after the closest match has been identified in the search range 610. As such, in some embodiments (e.g., associated with an AMVP mode), the motion vector of the merge candidate 436 may be determined based on a motion vector predicator (e.g., selecting the initial motion vector 602) and a motion vector difference (e.g., identifying a search result in the search range 610) of the merge candidate 436.

Figure 7:
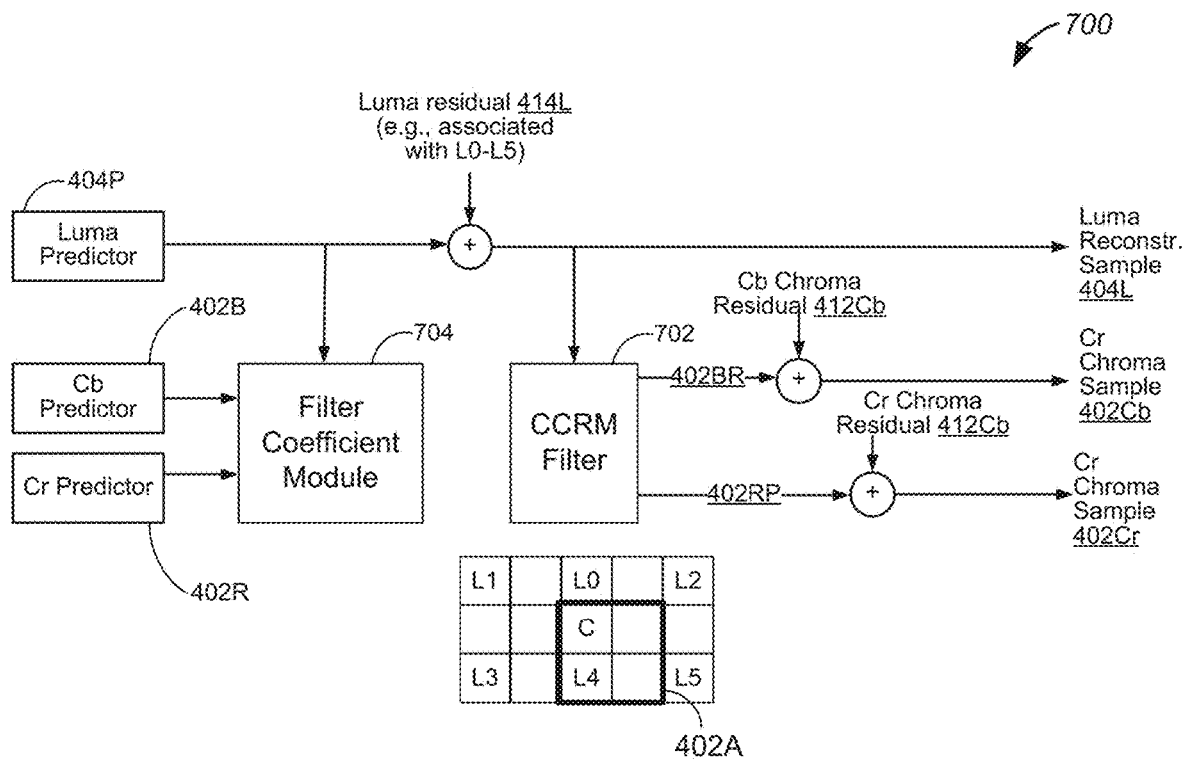
FIG. 7 is a schematic diagram of a cross-component residual model (CCRM) applied in a CCRM mode, in accordance with some embodiments.

FIG. 7 is a schematic diagram of a cross-component residual model (CCRM) 700 applied in a CCRM mode, in accordance with some embodiments. In some embodiments, when the first syntax signal indicates that the RT-CCRM mode is disabled, a second syntax element 440 for a CCRM mode is signaled to indicate whether the first chroma sample 402A is predicted from the one or more luma samples 404L. In some embodiments (e.g., associated with JVET-AD0108), the CCRM 700 may be applied to predict the first chroma sample 402A (e.g., including a Cr chroma sample 402Cr and a Cb chroma sample 402Cb) from reconstructed luma samples 404L when the current coding block 406C uses inter prediction or intra block copy (IBC). A luma predicator corresponds to predicted luma samples 404P determined based on one or more reference coding blocks 436, and the predicted luma samples 404P are compensated by luma residuals 414L to reconstructed luma samples 404L. Filter coefficients of a CCRM filter 702 are derived by a filter coefficient module 704 based on the predicted luma samples 404P provided by the luma predicator and the predicted chroma samples 402B and 402R provided by a Cb predictor and a Cr predictor. The predicted chroma samples include predicted Cb chroma samples 402B and predicted Cr chroma samples 402R. Based on the derived filter coefficients, the CCRM filter 702 is applied to predict chroma samples 402BP and 404RP corresponding to the first chroma sample 402A. The predicted chroma samples 402BP and 404RP are compensated by first residuals 412Cb and 412Cr to reconstruct the chroma samples 402Cr and 404Cb corresponding to the first chroma sample 404A.

In some embodiments, an eight-tap CCRM filter 702 is applied to combine six spatial luma samples (e.g., L0-L5), a nonlinear term, and a bias term to predict the first chroma sample 402A. Referring to FIG. 7, in some embodiments, the spatial luma samples (e.g., L0-L5) are obtained from the luma grid selecting the six luma samples closest to a chroma position C without downsampling. The predicted chroma value 402BR or 402BP (predChromaVal) is determined as follows:

$$predChromaVal \quad (1)$$
$$= c_0L0 + c_1L1 + c_2L2 + c_3L3 + c_4L4 + c_5L5$$
$$+ c_6\text{nonlinear}\,((L0 + L3 + 1) \gg 1) + c_7B$$

where $c_0$-$c_7$ are filter coefficients corresponding to the six spatial luma samples L0-L5, the nonlinear term nonlinear $((L0+L3+1)\gg1)$, and B is the bias term. In some embodiments, the filter coefficients may be derived using a division-free Gaussian elimination method associated with an enhanced compression model (ECM). In some embodiments, one or more offsets are applied to luma samples prior to filter derivation. In some embodiments, intra reference samples are used as additional input samples in filter derivation when the current coding block 406C has less than 64 chroma samples. CCCM's design of at most six rows and columns of intra reference samples is used. Coding blocks having 256 chroma samples or more are divided into sub-blocks that have at most 256 chroma samples. Subblocks containing zero luma residual are skipped.

In some embodiments, the first syntax element 408 is signaled when the current coding block 406C when the CCRM 700 is disabled. Further, in some embodiments, the first syntax element 408 is signaled when the current coding block 406C is encoded in the one of the inter prediction mode, the IBC mode, and the IntraTMP mode and when the CCRM 700 is disabled. In some embodiments, when the first syntax element 408 indicates that the RT-CCRM mode is disabled, a second syntax element 440 for the CCRM mode is signaled to indicate whether the first chroma sample 402A (FIG. 4B) is predicted from reconstructed luma samples corresponding to the one or more luma samples 404L.

Figure 8:
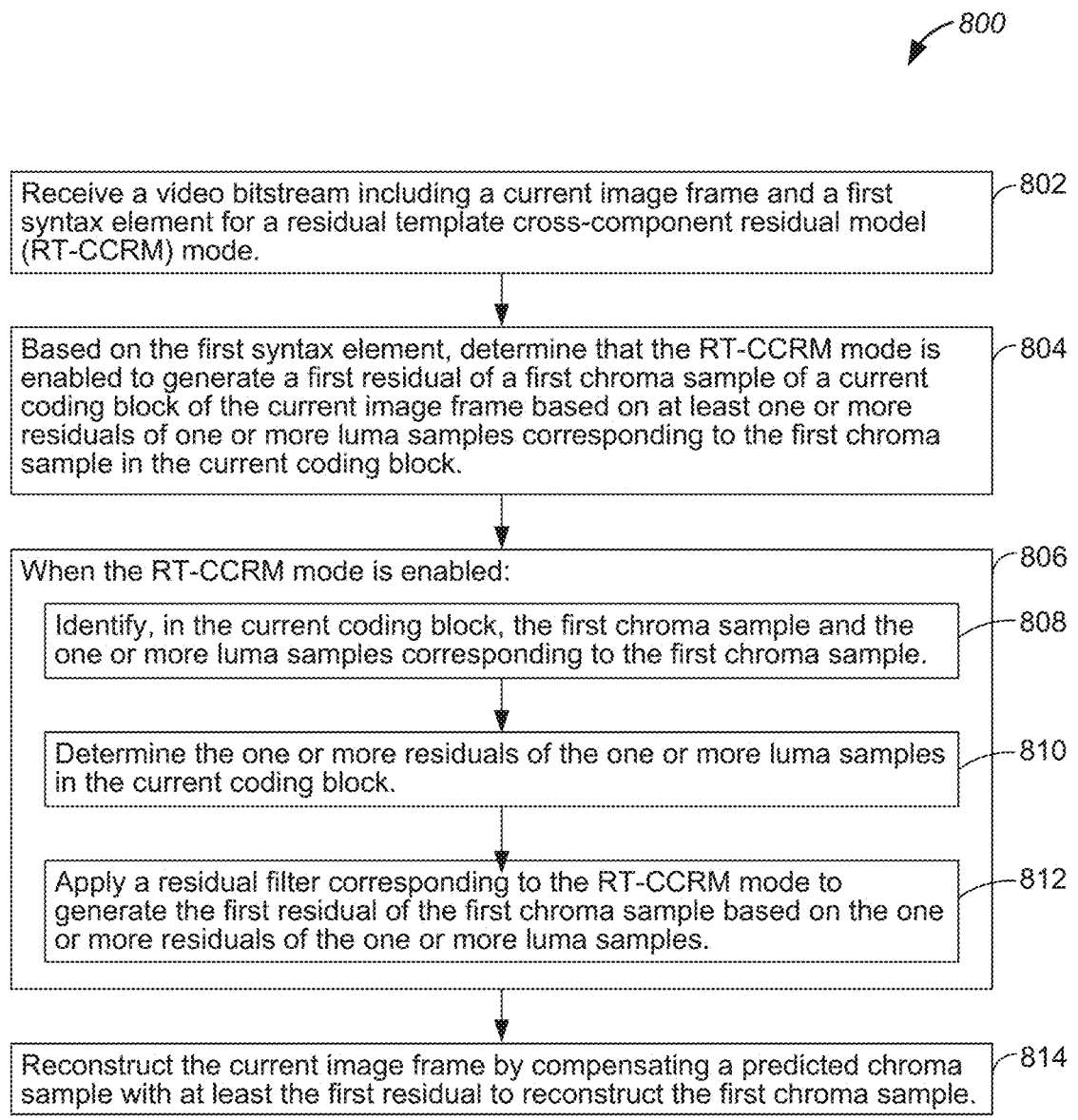
FIG. 8 is a flow diagram illustrating another example method of coding video, in accordance with some embodiments.

FIG. 8 is a flow diagram illustrating a method 800 of decoding video in accordance with some embodiments. The method 800 may be performed at a computing system (e.g., the server system 112, the source device 102, or the electronic device 120) having control circuitry and memory storing instructions for execution by the control circuitry. In some embodiments, the method 800 is performed by executing instructions stored in the memory (e.g., the memory 314) of the computing system. In some embodiments, the method 800 is applied jointly with one or more video codecs, including but not limited to, H.264, H.265/HEVC, H.266/VVC, AV1 and AVS/AVS2/AVS3. In some embodiments, a CCRM 700 (FIG. 7) may be used to predict chroma samples 402 from reconstructed luma samples 404 when a coded block is coded by inter prediction or intra block copy (IBC), in which prediction samples of a coding block of an image frame is determined based on two reference coding blocks 436 located in the same image frame. When the reconstructed luma sample 404 is used to predict chroma samples 402, the CCRM 700 acts as an Inter-CCCM, and performs in a different manner from residual cross-component filtering, which predicts, in a residual domain, residual data of chroma samples 402 using residual data from luma samples 404. By these means, residual cross-component filtering improves local illumination compensation.

In some embodiments, a bi-prediction with CU-level weight (BCW) is applied to combine the two prediction samples from the two reference coding blocks 436-1 and 436-2. In some embodiments, intra template matching prediction (IntraTMP) is a special intra prediction mode that copies the best prediction block 506 from the reconstructed portion of the current image frame 410, whose template (e.g., having an L-shape) match the current template 434. For a predefined search range, the encoder searches for the most similar template to the current template 434 in the reconstructed portion of the current image frame 410 and uses the corresponding block 506 as a prediction block. The encoder then signals the usage of this mode, and the same prediction operation is performed at the decoder side.

For an inter prediction mode including, but not limited to, inter prediction, IBC, IntraTMP, the residual data of the current template 434 and reference template from the luma component and chroma component are used to derive the filter coefficients 424 of a residual filter 416. Based on the filter coefficients 424, the residual filter 416 is applied to process luma reference block residual data 414L to predict the current chroma block residual data (e.g., the first residual 412A). Referring to FIG. 4A, a compensated chroma sample 402AC is derived based on a chroma sample 402P from inter prediction, IBC, or IntraTMP, and the above predicted current chroma block residual data (e.g., the first residual 412A).

In some embodiments associated with bitstream signaling, a flag (e.g., in a first syntax element 408 in FIG. 4B) is signaled to indicate whether the RT-CCRM is applied or not when the coded block 406C is coded in inter mode, IBC mode, or IntraTMP mode. In some embodiments, a flag (e.g., in a first syntax element 408 in FIG. 4B) is signaled to indicate whether the RT-CCRM is applied or not, when the coded block 406C is coded in inter mode, IBC mode, or IntraTMP mode and when a CCRM flag indicating whether the CCRM 700 is applied is false. In some embodiments, a flag (e.g., in a first syntax element 408 in FIG. 4B) is signaled to indicate whether the RT-CCRM is applied or not, when the coded block 406C is coded in inter mode, IBC mode, or IntraTMP mode. If this flag is false, a CCRM flag is signaled to indicate whether the CCRM 700 (FIG. 7) is used or not, when the CCRM 700 is available to the coded block 406C. In some embodiments, two flags 408A and 408B (FIG. 4B) are signaled to indicate whether the RT-CCRM is applied or not for Cb and Cr chroma samples, respectively. In some embodiments, a flag (e.g., in a first syntax element 408 in FIG. 4B) is inferred as false depends on template availability or a position of the coded block 406C in the current image frame 410, an associated subpicture, an associated tile, or an associated image slice.

In some embodiments associated with template matching, a block vector or a motion vector of a merge candidate 436 (e.g., a reference coding block 436 in FIG. 4B) is used to point to a reference template 438 for both of the luma samples 404 and chroma samples 402 in a merge mode. The merge mode at here includes but not limited to inter merge, affine merge, and IBC merge. In some embodiments, the reference template 438 is a weighted average of a first reference template 438-1 (FIG. 5) from a first reference list and a second reference template 438-2 (FIG. 5) from a second reference list, if the merge candidate 436 is a bi-predictive prediction. In some embodiments, LIC may be applied to reference template 438, when an LIC flag is true for the merge candidate 436. In some embodiments, a BCW weight may be applied to the weighted average of the first reference template 438-1 and the second reference template 438-2, when an equal weight is not used for the merge candidate 436. In some embodiments, the block vector of the intraTMP is used to point to the reference template 438 for the luma and chroma components.

In some embodiments, an advanced motion vector prediction (AMVP) mode is enabled. A motion vector of the merge candidate 436 is determined based on a motion vector predictor (MVP) and a motion vector difference (MVD) of the merge candidate 436. Alternatively, in some embodiments, when an AMVP mode is enabled. the merge candidate 436 is located on the current image frame 410. A block vector (BV) of the merge candidate 436 is determined based on a block vector predictor (BVP) and a block vector difference (BVD) of the merge candidate 436. The motion vector or block vector is used to point to the reference template 438 for the luma and chroma components in the AMVP mode.

In some embodiments, a current template 434 or a reference template 438 is a neighbor reconstructed region above or to the left of the current coding block 406C or an L-shape neighbor reconstructed region. The current template 434 is also used in template matching for inter prediction, intraTMP, or CCLM, MMLM, CCCM, GLM filter derivation. In some embodiments, the row number of the current template 434 located above the current coding block and the column number of the current template 434 located to the left of the current coding block are larger than or equal to 1. Further, in an example, the row number is not equal to the column number. In some embodiments, a plurality of template types are selected to derive the filter coefficients 424 of the residual filter 416 (FIG. 4A). For example, the filter coefficients are derived based on three template types (e.g., a neighbor reconstructed region above the current coding block 406C, a neighbor reconstructed region to the left of the current coding block 406C, and an L-shape neighbor reconstructed region). It is noted that, the reference template 438 has the same size and the same shape as the current template 434.

In some embodiments associated with filter coefficient derivation, any cross-component filter coefficient derivation includes but not limited to CCLM, MMLM, CCCM, GLM could be used to derive the filter coefficient(s). In some embodiments, two sets of RT-CCRM filter coefficients 424 (FIG. 4A) are applied to generate residuals 412A for the Cb chroma sample 402Cb and Cr chroma sample 402Cr, respectively.

In some embodiments associated with RT-CCRM filtering, the filter coefficients 424 cannot be derived for one of the Cb and Cr components, the filter output (e.g., first residual 412A) of the residual filter 416 is zero for a chroma component for which filter coefficients 424 cannot be derived when the RT-CCRM flag (e.g., in a first syntax element 408 in FIG. 4B) is true. Further, in some embodiments, the filter coefficients 424 of Cb component cannot be derived, the filter output (e.g., first residual 412A) is zero for the Cb color component. In some embodiments, the filter coefficients 424 of Cr component cannot be derived, the filter output (e.g., first residual 412A) is zero for the Cr color component. In some embodiments, a minimum value and/or maximum value will be applied to clip the filter output (e.g., the first residual 412A of the first chroma sample 402A) within the desired dynamic range.

In various embodiments of this application, a luma color component is replaced with a first color component, and a chroma color component is replaced with a second color component. For example, a video bitstream includes a current image frame and a first syntax element 408 for an RT-CCRM mode. Based on the first syntax element 408, it is determines that the RT-CCRM mode is enabled to generate a first residual of a first sample of a second color component in a current coding block of the current image frame based on one or more residuals of one or more samples of a first color component corresponding to the first sample of the second color component in the current coding block. When the RT-CCRM mode is enabled, the first sample of the second color component and the one or more samples of the first color component are identified. The one or more residuals of the first color component are identified in the current coding block, and processed by a residual filter corresponding to the RT-CCRM mode to generate the first residual of the first sample of the second color component. A predicted sample of the second color component is compensated with the first residual to reconstruct the first sample of the second color component, and applied to reconstruct the current image frame 410.

Although FIG. 8 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In some implementations, a method 800 is implemented for decoding video data. The method 800 includes receiving (operation 802) a video bitstream including a current image frame and a first syntax element for a residual template cross-component residual model (RT-CCRM) mode; based on the first syntax element, determining (operation 804) that the RT-CCRM mode is enabled to generate a first residual of a first chroma sample of a current coding block of the current image frame based on one or more residuals of one or more luma samples corresponding to the first chroma sample in the current coding block; when the RT-CCRM mode is enabled (operation 806): identifying (operation 808), in the current coding block, the first chroma sample and the one or more luma samples corresponding to the first chroma sample; determining (operation 810) the one or more residuals of the one or more luma samples in the current coding block; and applying (operation 812) a residual filter corresponding to the RT-CCRM mode to generate the first residual of the first chroma sample based on the one or more residuals of the one or more luma samples; and reconstructing (operation 814) the current image frame by compensating a predicted chroma sample with at least the first residual to reconstruct the first chroma sample.

(A2) In some embodiments of A1, the first syntax element for the RT-CCRM mode includes a first flag and a second flag, the first flag indicating whether the RT-CCRM mode is enabled to generate a blue chroma residual of a blue-difference (Cb) chroma sample, the second flag indicating whether the RT-CCRM mode is enabled to generate a red chroma residual of a red-difference (Cr) chroma sample, the first chroma sample including the Cb chroma sample and the Cr chroma sample.

(A3) In some embodiments of A1 or 2, the method 800 further includes determining that the current coding block is predicted based on a merge mode; in accordance with the merge mode, determining a merge candidate based on a vector; identifying a reference template associated with the merge candidate based on the vector; identifying a current template associated with the current coding block; and determining a plurality of filter coefficients of the residual filter based on the reference template and the current template.

(A4) In some embodiments of A3, the merge mode is one of an inter merge mode, an affine merge mode, and an intra block copy (IBC) mode.

(A5) In some embodiments of A3 or 4, the merge mode corresponds to a bi-predictive prediction. The merge candidate includes a first candidate selected from a first reference list and a second candidate selected from a second reference list. The reference template is a weighted average of a first reference template corresponding to the first candidate and a second reference template corresponding to the second candidate.

(A6) In some embodiments of A5, the method 800 includes determining at least one bi-prediction with CU-level weight (BCW) for the first reference template and the second reference template; and applying the at least one BCW to determine the reference template as the weighted average of the first reference template and the second reference template.

(A7) In some embodiments of any of A3-A6, the method 800 further includes, when a flag for local intensity compensation (LIC) is enabled for the merge candidate, applying local intensity compensation to the reference template.

(A8) In some embodiments of any of A3-A7, the method 800 further includes, in an advanced motion vector prediction (AMVP) mode, implementing one of: determining the vector of the merge candidate based on a motion vector predicator (MVP) and a motion vector difference (MVD) of the merge candidate; and determining the vector of the merge candidate based on a block vector predicator (BVP) and a block vector difference (BVD) of the merge candidate.

(A9) In some embodiments of any of A3-A8, the current template is selected from: a reconstructed top neighboring region, a reconstructed left neighboring region, and an L-shape reconstructed L-shape neighboring region.

(A10) In some embodiments of any of A3-A9, the current template includes a filter template applied to determine a first filter corresponding to one of an inter prediction mode, an intraTMP mode, a multi-model linear model (MMLM) mode, a cross-component linear model (CCLM) mode, a convolutional cross-component intra prediction model (CCCM), and a gradient linear model (GLM) mode.

(A11) In some embodiments of any of A3-A10, each of the reference template and the current template includes a respective top template and a respective left template, the respective top template having at least one of row, the respective left template having at least one column.

(A12) In some embodiments of any of A3-A11, the reference template and the current template correspond to one of a plurality of predefined template types.

(A13) In some embodiments of A12, the plurality of predefined template types include at least: a first type of reconstructed top neighboring region, a second type of reconstructed left neighboring region, and a third type of reconstructed L-shape neighboring region.

(A14) In some embodiments of any of A1-A13, the method 800 further includes determining that the current coding block is predicted in an intra template matching prediction (IntraTMP) mode; determining a merge candidate based on a block vector; identifying a reference template associated with the merge candidate based on the block vector, the reference template including a reference luma template and a reference chroma template; identifying a current template associated with the current coding block; and determining a plurality of filter coefficients of the residual filter based on the reference template and the current template.

(A15) In some embodiments of any of A1-A14, the method 800 further includes determining that the current coding block is predicted using an alternative filter corresponding to one of a multi-model linear model (MMLM) mode, a cross-component linear model (CCLM) mode, a convolutional cross-component intra prediction model (CCCM), and a gradient linear model (GLM) mode; determining that the alternative filter has a plurality of first filter coefficients; and determining a plurality of filtering coefficients of the residual filter based on the plurality of first filter coefficients of the alternative filter.

(A16) In some embodiments of any of A1-A14, the residual filter includes a first residual filter for a first one of a blue-difference (Cb) chroma sample and a red-difference (Cr) chroma sample. The method 800 further includes determining that the current coding block is predicted using a first alternative filter and a second alternative filter corresponding to two distinct modes of an MMLM mode, a CCLM mode, a CCCM, and a GLM mode; determining that the first alternative filter has a plurality of first filter coefficients and that the second alternative filter has a plurality of second filter coefficients; determining a plurality of filtering coefficients of the first residual filter based on the plurality of first filter coefficients of the first alternative filter; and determining a plurality of filtering coefficients of a second residual filter based on the plurality of second filter coefficients of the second alternative filter, where the second residual filter is applied to generate a residual of a second distinct one of the Cb chroma sample and the Cr chroma sample.

(A17) In some embodiments of any of A1-A16, the residual filter corresponds to one of a blue-difference (Cb) chroma sample and a red-difference (Cr) chroma sample. The method 800 further includes, when a plurality of filter coefficients of the residual filter are not derived based on a plurality of color templates, setting a residual of the one of the Cb chroma sample and the Cr chroma sample to 0.

(A18) In some embodiments of any of A1-A17, the method 800 further includes clipping the residual of the first chroma sample within a dynamic range defined between a first residual value and a second residual value that is greater than the first residual value.

(A19) In some embodiments of any of A1-A18, the video bitstream further includes a second residual of the first chroma sample, and reconstructing the current image frame includes compensating the predicted chroma sample with both the first residual and the second residual to reconstruct the first chroma sample (A20) In some embodiments, a method includes receiving video data comprising a current image frame; encoding the current image frame including a current coding block; determining whether a residual template cross-component residual model (RT-CCRM) is enabled to generate a residual of a first chroma sample of the current coding block of the current image frame based on one or more residuals of one or more luma samples in the current coding block; transmitting the encoded current image frame via a video bitstream; and signaling, via the video bitstream, a first syntax element to indicate whether the RT-CCRM mode is enabled to generate the residual of the first chroma sample of the current coding block of the current image frame based on the one or more residuals of the one or more luma samples in the current coding block.

(A21) In some embodiments of A20, the method further includes determining that the current coding block is encoded in one of an inter predication mode, an intra block copy (IBC) mode, and an intra template matching prediction (IntraTMP) mode; where the first syntax element is signaled when the current coding block is encoded in the one of the inter prediction mode, the IBC mode, and the IntraTMP mode.

(A22) In some embodiments of A21, the method further includes determining that the cross-component residual model (CCRM) mode is disabled to abort prediction of the first chroma sample from reconstructed luma samples corresponding to the one or more luma samples. The first syntax element is signaled when the current coding block is encoded in the one of the inter prediction mode, the IBC mode, and the IntraTMP mode and when the CCRM is disabled.

(A23) In some embodiments of A21, the method further includes, when the first syntax signal indicates that the RT-CCRM mode is disabled, signaling a second syntax element for a CCRM mode indicating whether the first chroma sample is predicted from reconstructed luma samples corresponding to the one or more luma samples.

(A24) In some embodiments of any of A20-A23, the method further includes resetting the first syntax element to a value indicating that the RT-CCRM mode is disabled based on template availability and a coding block position in a picture, subpicture, a tile, or a slice of the current image frame.

(A25) In some embodiments, a method includes obtaining a source video sequence including a current coding block of a current image frame and performing a conversion between the source video sequence and a video bitstream. The video bitstream includes the current image frame and a first syntax element for a residual template cross-component residual model (RT-CCRM) mode indicating whether to generate a residual of a first chroma sample of a current coding block of the current image frame based on one or more residuals of one or more luma samples in the current coding block. A residual filter corresponding to the RT-CCRM mode is applied to generate the residual of the first chroma sample based on the one or more residuals of the one or more luma samples, in accordance with a determination that the first syntax element indicates that the RT-CCRM mode is enabled.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A25 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A25 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
receiving a video bitstream including a current image frame and a first syntax element for a residual template cross-component residual model (RT-CCRM) mode;
based on the first syntax element, determining that the RT-CCRM mode is enabled to generate a first residual of a first chroma sample of a current coding block of the current image frame based on one or more residuals of one or more luma samples corresponding to the first chroma sample in the current coding block;
when the RT-CCRM mode is enabled:
identifying, in the current coding block, the first chroma sample and the one or more luma samples corresponding to the first chroma sample;
determining the one or more residuals of the one or more luma samples in the current coding block; and
applying a residual filter corresponding to the RT-CCRM mode to generate the first residual of the first chroma sample based on the one or more residuals of the one or more luma samples; and
reconstructing the current image frame by compensating a predicted chroma sample with at least the first residual to reconstruct the first chroma sample.

2. The method of claim 1, wherein the first syntax element for the RT-CCRM mode includes a first flag and a second flag, the first flag indicating whether the RT-CCRM mode is enabled to generate a blue chroma residual of a blue-difference (Cb) chroma sample, the second flag indicating whether the RT-CCRM mode is enabled to generate a red chroma residual of a red-difference (Cr) chroma sample, the first chroma sample including the Cb chroma sample and the Cr chroma sample.

3. The method of claim 1, further comprising:
determining that the current coding block is predicted based on a merge mode;
in accordance with the merge mode, determining a merge candidate based on a vector;
identifying a reference template associated with the merge candidate based on the vector;
identifying a current template associated with the current coding block; and
determining a plurality of filter coefficients of the residual filter based on the reference template and the current template.

4. The method of claim 3, wherein the merge mode is one of an inter merge mode, an affine merge mode, and an intra block copy (IBC) mode.

5. The method of claim 3, wherein:
the merge mode corresponds to a bi-predictive prediction;
the merge candidate includes a first candidate selected from a first reference list and a second candidate selected from a second reference list; and
the reference template is a weighted average of a first reference template corresponding to the first candidate and a second reference template corresponding to the second candidate.

6. The method of claim 3, further comprising:
when a flag for local intensity compensation (LIC) is enabled for the merge candidate, applying local intensity compensation to the reference template.

7. The method of claim 3, further comprising, in an advanced motion vector prediction (AMVP) mode, implementing one of:
determining the vector of the merge candidate based on a motion vector predicator (MVP) and a motion vector difference (MVD) of the merge candidate; and
determining the vector of the merge candidate based on a block vector predicator (BVP) and a block vector difference (BVD) of the merge candidate.

8. The method of claim 3, wherein the current template is selected from: a reconstructed top neighboring region, a reconstructed left neighboring region, and an L-shape reconstructed L-shape neighboring region.

9. The method of claim 3, wherein the current template includes a filter template applied to determine a first filter corresponding to one of an inter prediction mode, an intraTMP mode, a multi-model linear model (MMLM) mode, a cross-component linear model (CCLM) mode, a convolutional cross-component intra prediction model (CCCM), and a gradient linear model (GLM) mode.

10. The method of claim 3, wherein each of the reference template and the current template includes a respective top template and a respective left template, the respective top template having at least one of row, the respective left template having at least one column.

11. The method of claim 1, further comprising:
determining that the current coding block is predicted in an intra template matching prediction (IntraTMP) mode;
determining a merge candidate based on a block vector;
identifying a reference template associated with the merge candidate based on the block vector, the reference template including a reference luma template and a reference chroma template;
identifying a current template associated with the current coding block; and
determining a plurality of filter coefficients of the residual filter based on the reference template and the current template.

12. The method of claim 1, further comprising:
determining that the current coding block is predicted using an alternative filter corresponding to one of a multi-model linear model (MMLM) mode, a cross-component linear model (CCLM) mode, a convolutional cross-component intra prediction model (CCCM), and a gradient linear model (GLM) mode;
determining that the alternative filter has a plurality of first filter coefficients; and
determining a plurality of filtering coefficients of the residual filter based on the plurality of first filter coefficients of the alternative filter.

13. The method of claim 1, wherein the residual filter includes a first residual filter for a first one of a blue-difference (Cb) chroma sample and a red-difference (Cr) chroma sample, the method further comprising:
- determining that the current coding block is predicted using a first alternative filter and a second alternative filter corresponding to two distinct modes of an MMLM mode, a CCLM mode, a CCCM, and a GLM mode;
- determining that the first alternative filter has a plurality of first filter coefficients and that the second alternative filter has a plurality of second filter coefficients;
- determining a plurality of filtering coefficients of the first residual filter based on the plurality of first filter coefficients of the first alternative filter; and
- determining a plurality of filtering coefficients of a second residual filter based on the plurality of second filter coefficients of the second alternative filter, wherein the second residual filter is applied to generate a residual of a second distinct one of the Cb chroma sample and the Cr chroma sample.

14. The method of claim 1, further comprising:
- clipping the residual of the first chroma sample within a dynamic range defined between a first residual value and a second residual value that is greater than the first residual value.

15. The method of claim 1, wherein the video bitstream further includes a second residual of the first chroma sample, and reconstructing the current image frame includes compensating the predicted chroma sample with both the first residual and the second residual to reconstruct the first chroma sample.

16. A computing system, comprising:
- control circuitry; and
- memory storing one or more programs configured to be executed by the control circuitry, the one or more programs further comprising instructions for:
  - receiving video data comprising a current image frame;
  - encoding the current image frame including a current coding block;
  - determining whether a residual template cross-component residual model (RT-CCRM) is enabled to generate a first residual of a first chroma sample of the current coding block of the current image frame based on one or more residuals of one or more luma samples in the current coding block;
  - transmitting the encoded current image frame via a video bitstream; and
  - signaling, via the video bitstream, a first syntax element to indicate whether the RT-CCRM mode is enabled to generate the first residual of the first chroma sample of the current coding block of the current image frame based on the one or more residuals of the one or more luma samples in the current coding block.

17. The computer system of claim 16, wherein the one or more programs further comprises instructions for:
- determining that the current coding block is encoded in one of an inter predication mode, an intra block copy (IBC) mode, and an intra template matching prediction (IntraTMP) mode;
- wherein the first syntax element is signaled when the current coding block is encoded in the one of the inter prediction mode, the IBC mode, and the IntraTMP mode.

18. The computer system of claim 17, wherein the one or more programs further comprises instructions for:
- determining that the cross-component residual model (CCRM) mode is disabled to abort prediction of the first chroma sample from reconstructed luma samples corresponding to the one or more luma samples;
- wherein the first syntax element is signaled when the current coding block is encoded in the one of the inter prediction mode, the IBC mode, and the IntraTMP mode and when the CCRM is disabled.

19. The computer system of claim 17, wherein the one or more programs further comprises instructions for:
- when the first syntax signal indicates that the RT-CCRM mode is disabled, signaling a second syntax element for a CCRM mode indicating whether the first chroma sample is predicted from reconstructed luma samples corresponding to the one or more luma samples.

20. A non-transitory computer-readable storage medium storing one or more programs for execution by control circuitry of a computing system, the one or more programs comprising instructions for:
- obtaining a source video sequence including a current coding block of a current image frame; and
- performing a conversion between the source video sequence and a video bitstream, wherein the video bitstream comprises:
  - the current image frame; and
  - a first syntax element for a residual template cross-component residual model (RT-CCRM) mode indicating whether to generate a first residual of a first chroma sample of a current coding block of the current image frame based on one or more residuals of one or more luma samples in the current coding block;
- wherein a residual filter corresponding to the RT-CCRM mode is applied to generate the first residual of the first chroma sample based on the one or more residuals of the one or more luma samples, in accordance with a determination that the first syntax element indicates that the RT-CCRM mode is enabled.

* * * * *